US012684104B2

(12) United States Patent
Tsuru et al.

(10) Patent No.: US 12,684,104 B2
(45) Date of Patent: Jul. 14, 2026

(54) INFORMATION PROCESSING DEVICE AND INFORMATION PROCESSING METHOD

(71) Applicant: SONY INTERACTIVE ENTERTAINMENT INC., Tokyo (JP)

(72) Inventors: Daisuke Tsuru, Chiba (JP); Mitsuru Nishibe, Chiba (JP); Masaki Uchida, Chiba (JP); Yuto Hayakawa, Tokyo (JP); Kenzo Nishikawa, Tokyo (JP); Takehiro Tominaga, Tokyo (JP); Takanori Minamino, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/722,556

(22) PCT Filed: Dec. 23, 2022

(86) PCT No.: PCT/JP2022/047633
§ 371 (c)(1),
(2) Date: Jun. 20, 2024

(87) PCT Pub. No.: WO2023/149126
PCT Pub. Date: Aug. 10, 2023

(65) Prior Publication Data
US 2025/0310506 A1 Oct. 2, 2025

(30) Foreign Application Priority Data
Feb. 4, 2022 (JP) ................................. 2022-016494

(51) Int. Cl.
*H04N 13/344* (2018.01)
*H04N 13/366* (2018.01)
*H04N 23/60* (2023.01)

(52) U.S. Cl.
CPC ......... *H04N 13/344* (2018.05); *H04N 13/366* (2018.05); *H04N 23/60* (2023.01)

(58) Field of Classification Search
CPC .... H04N 13/344; H04N 13/366; H04N 23/60; G02B 27/017; G06F 3/011; G06F 3/012;
(Continued)

(56) References Cited

U.S. PATENT DOCUMENTS 10,987,574 B2 * 4/2021 Mikhailov ........... G09G 3/3406
2015/0235424 A1 * 8/2015 Wang ........................ G06T 7/30
345/633
(Continued)

FOREIGN PATENT DOCUMENTS

| JP | 2016045874 A | 4/2016 |
| JP | 2021114310 A | 8/2021 |
| WO | WO-2016199731 A1 | 12/2016 |

OTHER PUBLICATIONS

International Search Report for corresponding International Application No. PCT/JP2022/047633, dated Mar. 7, 2023, pp. 1-5.

*Primary Examiner* — Bryan Earles
(74) *Attorney, Agent, or Firm* — Kilpatrick Townsend & Stockton LLP

(57) ABSTRACT

An image generation device sequentially acquires a frame 150 of a moving image captured by a stereo camera included in a head-mounted display, and generates a display image 154 to be used for video see-through or the like. A crop section of the image generation device crops a region 152*b* in which a floor surface appears, and sets the cropped region as an image 156 for setting a play area in which the user is movable. In addition, the crop section crops a region 152*c* with a predetermined size in which the front of the head-
(Continued)

mounted display appears, and sets the cropped region as an image 158 for acquiring state information regarding the head-mounted display.

20 Claims, 14 Drawing Sheets

(58) Field of Classification Search
CPC ... G06F 3/013; G06T 7/01; G06T 7/13; G06T 7/521; G06T 7/593; G06T 7/73; G06T 19/006
See application file for complete search history.

(56) References Cited

U.S. PATENT DOCUMENTS

| | | | | |
|---|---|---|---|---|
| 2017/0206666 | A1* | 7/2017 | Homma | G06F 3/017 |
| 2017/0285736 | A1* | 10/2017 | Young | G06F 3/147 |
| 2018/0295290 | A1* | 10/2018 | Nakamura | G06F 1/1686 |
| 2019/0251892 | A1* | 8/2019 | Stoll | A63F 13/213 |
| 2019/0274001 | A1* | 9/2019 | Arteaga | H04R 5/0335 |
| 2020/0051328 | A1* | 2/2020 | Mohan | G06F 3/012 |
| 2023/0296405 | A1* | 9/2023 | Puig Adamuz | G06T 7/593 |
| | | | | 345/419 |
| 2024/0054749 | A1* | 2/2024 | Tsuchie | G06F 3/012 |

* cited by examiner

F I G . 4
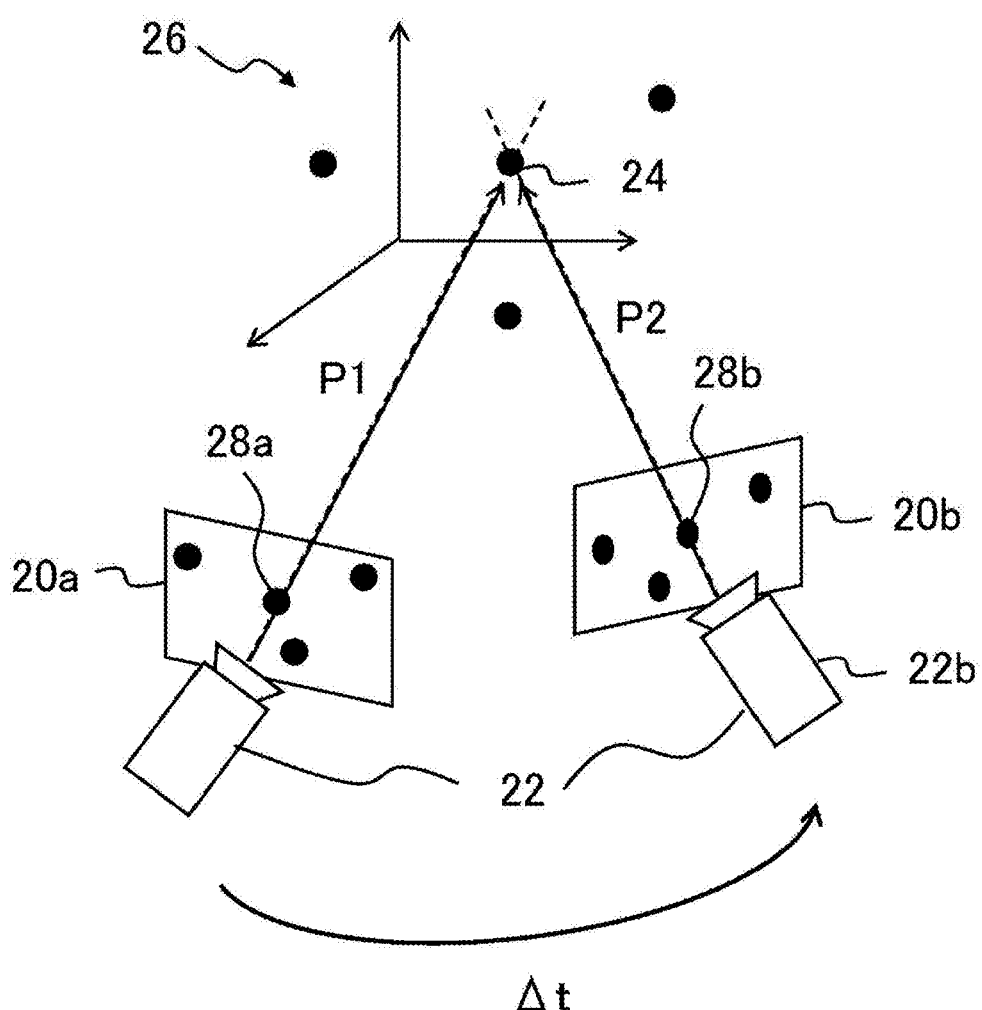
F I G . 5
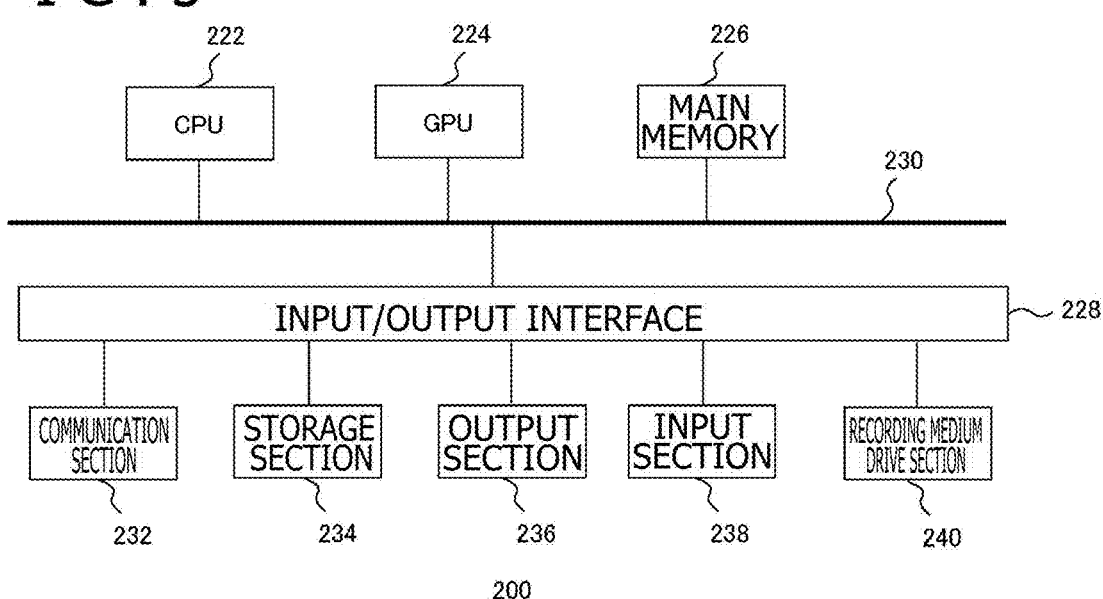
200

F I G . 6
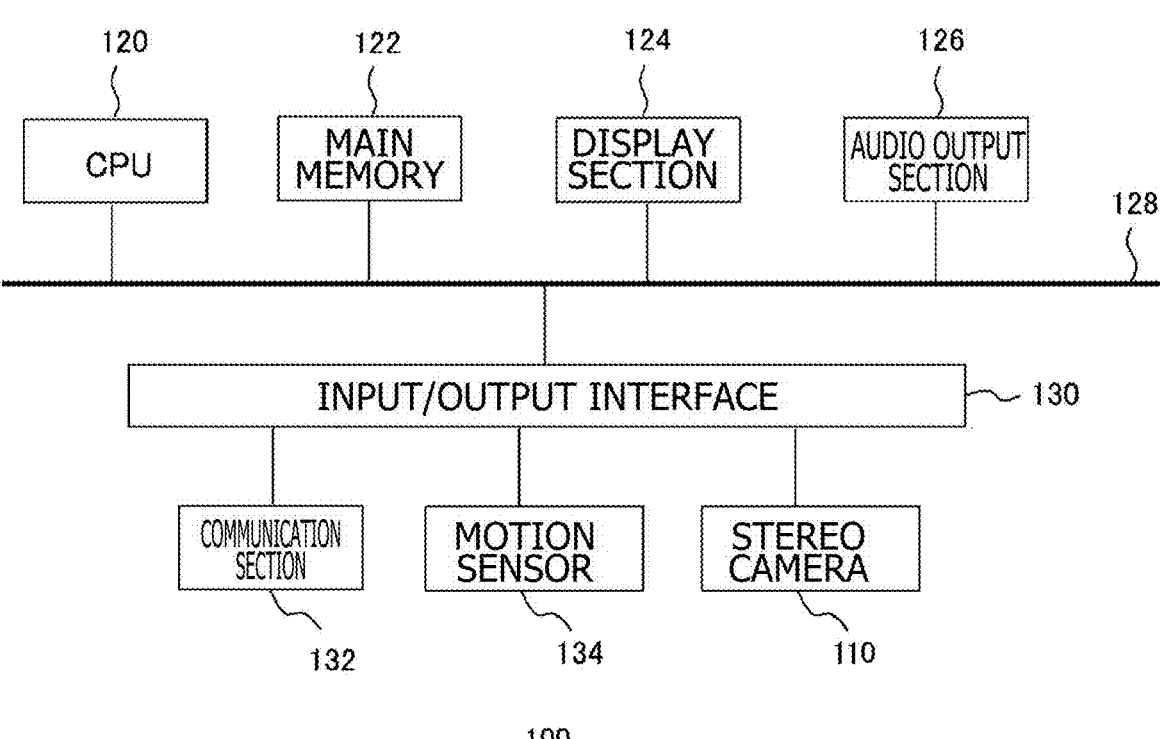

F I G . 1 0
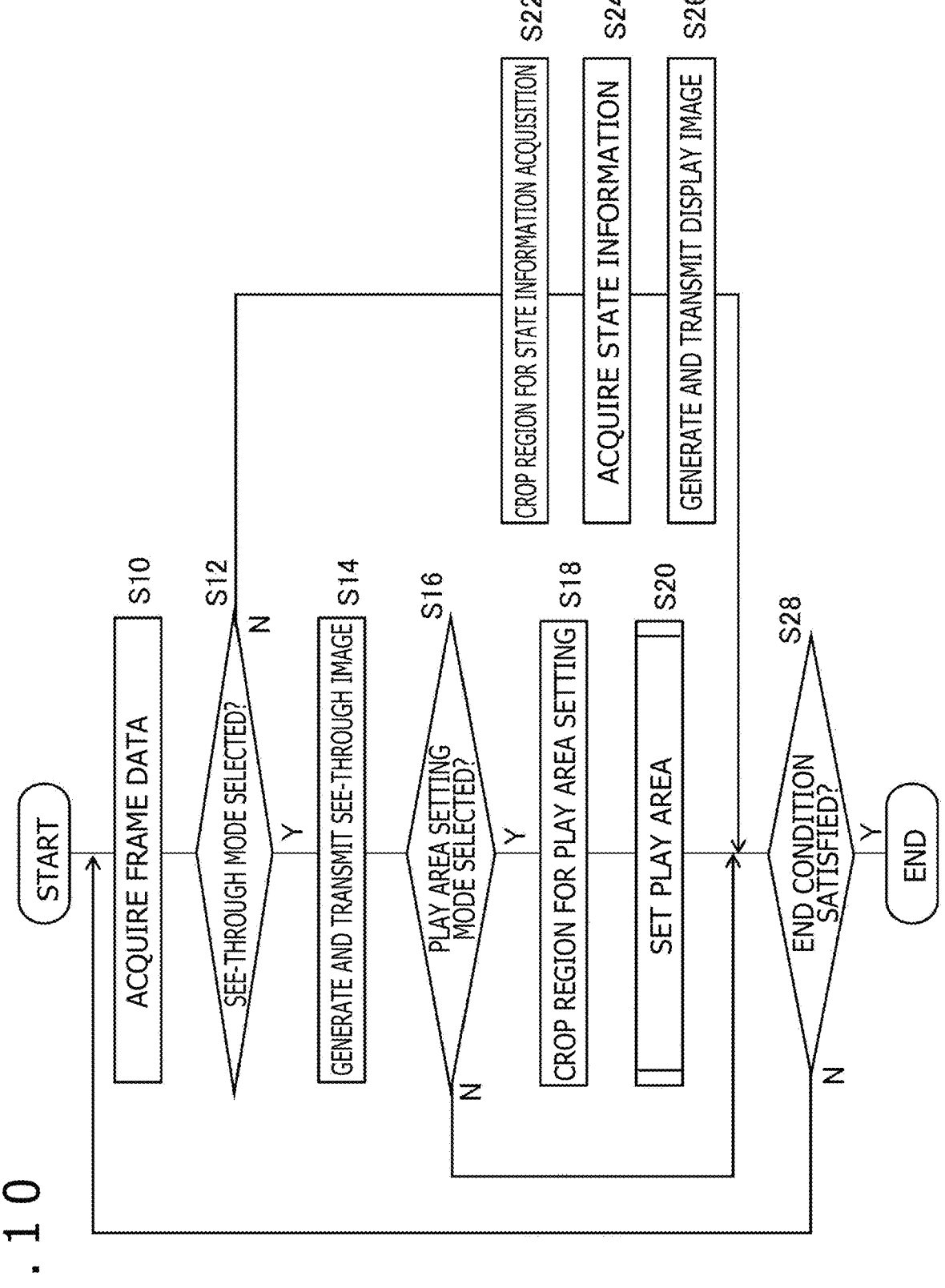

F I G . 1 1
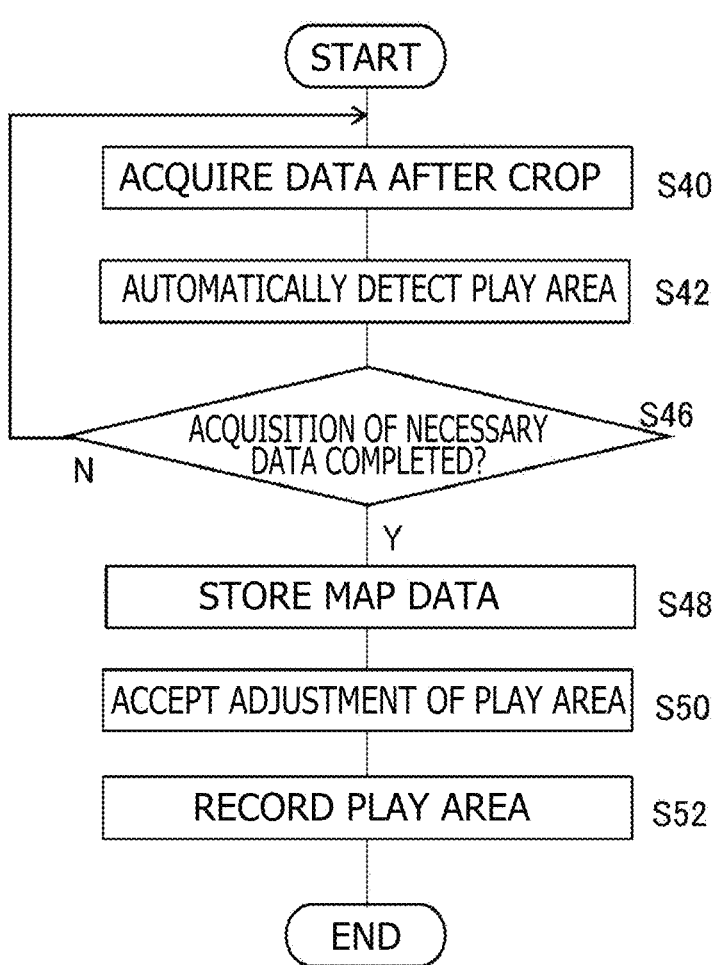

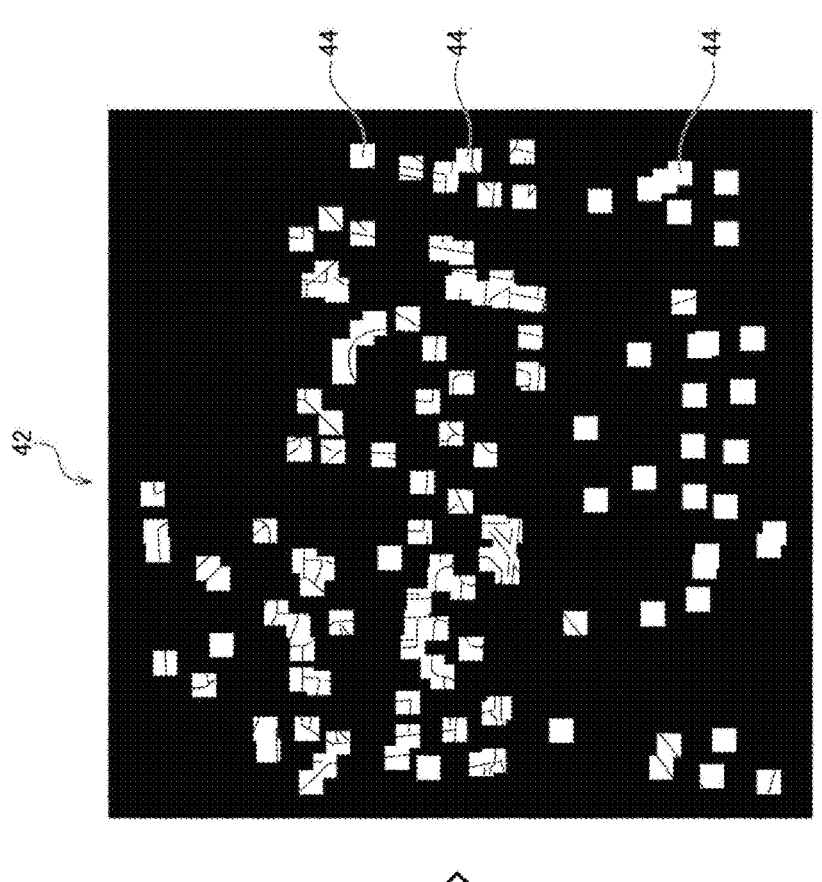
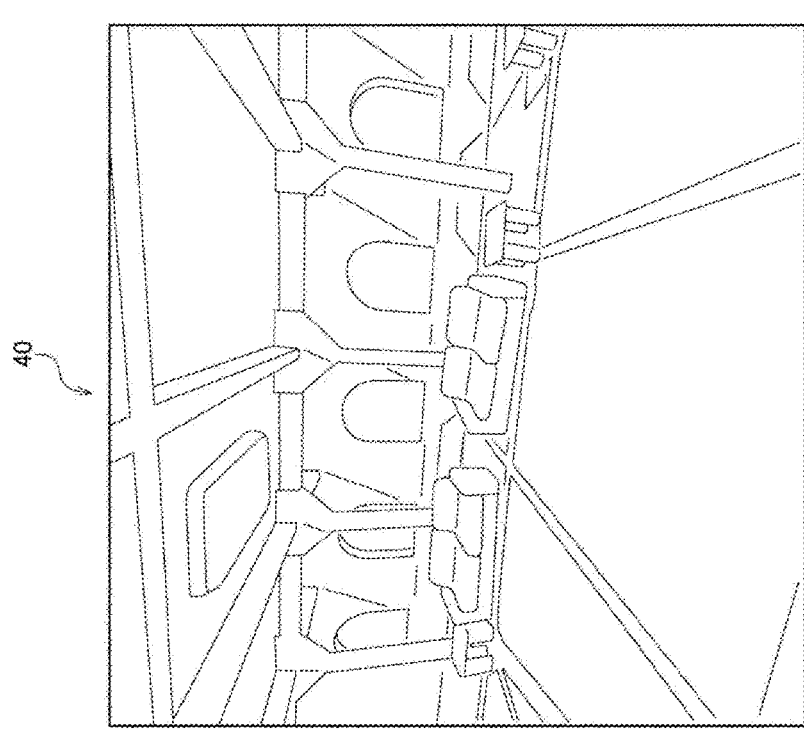
F I G . 1 3

INFORMATION PROCESSING DEVICE AND INFORMATION PROCESSING METHOD

CROSS REFERENCE TO RELATED APPLICATIONS

This application is a National Stage of International Application No. PCT/JP2022/047633 filed on Dec. 23, 2022, which claims priority from Japanese Patent Application 2022-016494, filed on Feb. 4, 2022. The contents of the above document is incorporated herein by reference in its entirety.

TECHNICAL FIELD

The present invention relates to an information processing device and an information processing method which realize image representation through a head-mounted display.

BACKGROUND ART

An image display system in which a user who wears a head-mounted display can appreciate a target space from a freely selected viewpoint has been known. For example, electronic content which achieves virtual reality (VR) by setting a virtual three-dimensional space as a display object and causing an image corresponding to a line-of-sight direction of a user to be displayed on a head-mounted display has been known. With use of the head-mounted display, it is also possible to enhance a sense of immersion in a video and improve an operability of an application such as a game. In addition, a walk-through system in which a user who wears the head-mounted display can virtually walk around in a space displayed as a video if the user physically moves has also been developed.

SUMMARY

Technical Problem

In order to provide a high-quality user experience with use of the head-mounted display, it may be required to accurately and constantly recognize the state of real objects such as the position and the posture of the user and the positional relation of the user to furniture and walls around the user. Meanwhile, the numbers of sensors and other necessary equipment increase, as an attempt is made to increase the amount of information to be acquired and improve the accuracy of information. This causes problems in terms, for example, of manufacturing cost, weight, and power consumption.

The present invention has been made in view of such problems above, and one object thereof is to provide a technique of capable of processing, with higher accuracy, content associated with image display through the head-mounted display, even with a simple apparatus configuration.

Solution to Problem

In order to solve the above problems, an aspect of the present invention relates to an information processing device. This information processing device includes a display control section configured to cause a head-mounted display to display a moving image being currently captured by a camera included in the head-mounted display, as a display image, a crop section configured to cut a part of a region out of a frame of the moving image, in accordance with predetermined rules, and an image analysis section configured to analyze an image of the part of the region, and to acquire data necessary when the head-mounted display is caused to display an image different from the moving image.

Another aspect of the present invention is an information processing method. This information processing method includes a step of causing a head-mounted display to display a moving image being currently captured by a camera included in the head-mounted display, as a display image, a step of cutting a part of a region out of a frame of the moving image, in accordance with predetermined rules, and a step of analyzing an image of the part of the region, and acquiring data necessary when the head-mounted display is caused to display an image different from the moving image.

It is to be noted that any combinations of the components described above and the expressions of the present invention that are converted between a system, a computer program, a recording medium on which the computer program is readably recorded, a data structure, and the like are also effective as aspects of the present invention.

Advantageous Effect of Invention

According to the present invention, it is possible to process, with higher accuracy, content associated with image display through the head-mounted display, even with a simple apparatus configuration.

BRIEF DESCRIPTION OF DRAWINGS

FIG. 4 is a diagram outlining the principle of visual simultaneous localization and mapping (SLAM).

FIG. 5 is a diagram illustrating an internal circuit configuration of the image generation device according to the embodiment.

FIG. 6 is a diagram illustrating an internal circuit configuration of the head-mounted display according to the embodiment.

FIG. 10 is a flowchart indicating a procedure for allowing the image generation device to execute various processes by use of a captured image in the embodiment.

FIG. 11 is a flowchart indicating a processing procedure for allowing a play area control section to set a play area in step S20 of FIG. 10.

FIG. 13 is a diagram illustrating an image of a frame captured by a stereo camera, and data on a keyframe obtained from this image according to the present embodiment.

DESCRIPTION OF EMBODIMENT

Figure 1:
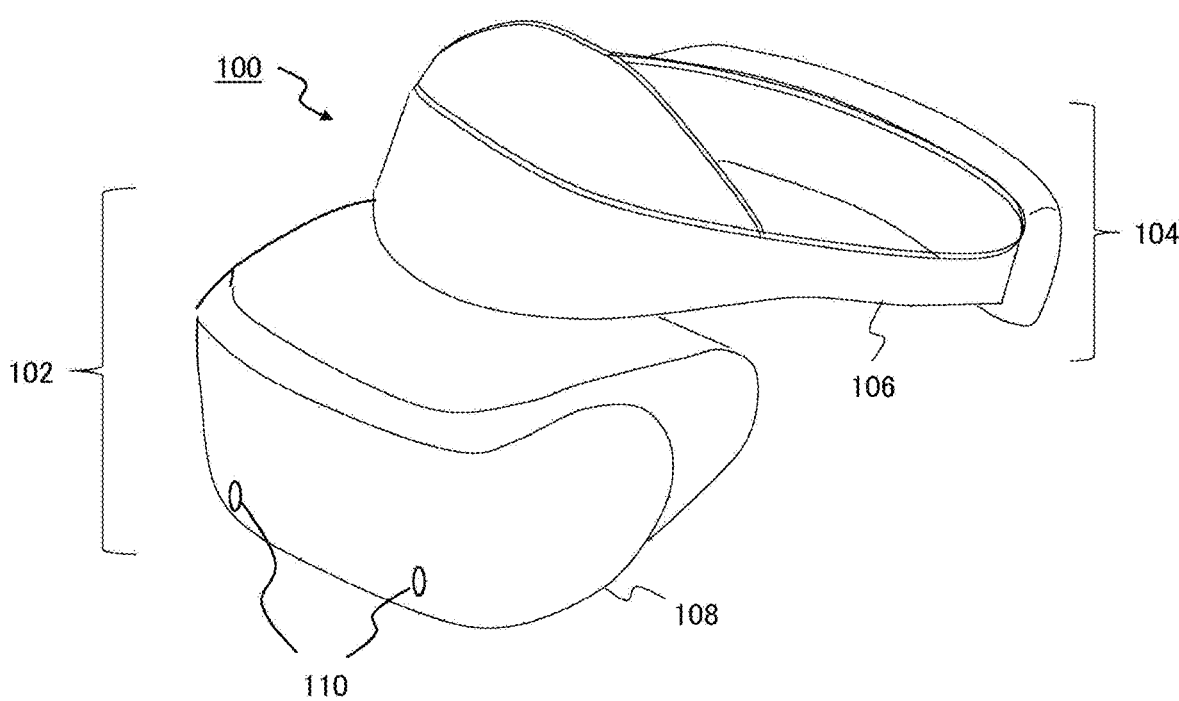
FIG. 1 is a view illustrating the appearance of a head-mounted display according to an embodiment.

The present embodiment relates to an image display system which displays an image on a head-mounted display worn on the head of a user. FIG. 1 illustrates the appearance of a head-mounted display 100. In this example, the head-mounted display 100 includes an output mechanism section 102 and a mounting mechanism section 104. The mounting mechanism section 104 includes a mounting band 106 that achieves securing of the device around the user's head by being worn by the user.

The output mechanism section 102 includes a housing 108 having such a shape as to cover the user's right and left eyes in a state in which the head-mounted display 100 is worn by the user. A display panel is disposed inside the housing 108 and configured to face the eyes of the user when the user is wearing the device. It is assumed that the display panel of the head-mounted display 100 according to the embodiment is not transmissive. In other words, the head-mounted display 100 is a light opaque head-mounted display.

The housing 108 may further include therein an eyepiece lens that is positioned between the display panel and the eyes of the user to enlarge the viewing angle of the user when the user is wearing the head-mounted display 100. The head-mounted display 100 may additionally include speakers or earphones that are placed at positions corresponding to those of the ears of the user when the user is wearing the head-mounted display 100. Further, the head-mounted display 100 includes a built-in motion sensor to detect translational motions and rotational motions of the head of the user who wears the head-mounted display 100, as well as the position and the posture of the user's head at each time point.

Moreover, the head-mounted display 100 includes a stereo camera 110 at a front surface of the housing 108. The stereo camera 110 captures a moving image of the surrounding real space in the field of view corresponding to a line-of-sight direction of the user. When the captured image is immediately displayed, what is generally called video see-through is achieved to enable the user to view the situation of the real space in the direction in which the user faces, as it is. Further, augmented reality (AR) can be realized if a virtual object is drawn on an image of a real object appearing in the captured image.

Figure 2:
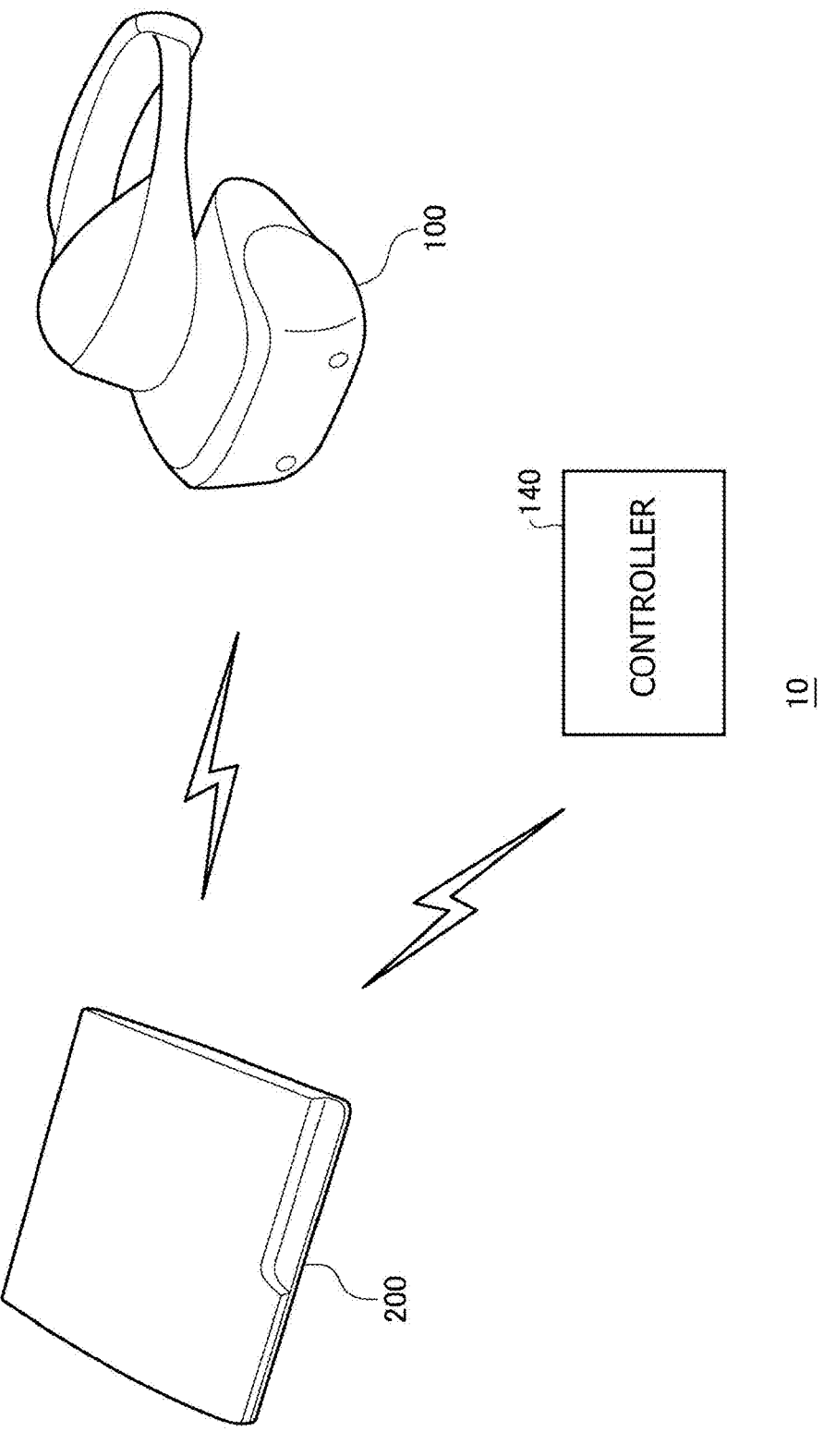
FIG. 2 is a view illustrating a configuration example of an image display system according to the embodiment.

FIG. 2 is a view illustrating a configuration example of the image display system according to the embodiment. The image display system 10 includes the head-mounted display 100, an image generation device 200, and a controller 140. The head-mounted display 100 is connected to the image generation device 200 through wireless communication. The image generation device 200 may be further connected to a server through a network. In such a case, the server may supply, to the image generation device 200, data regarding an online application such as a game in which a plurality of users can participate through the network.

The image generation device 200 is an information processing device that identifies the position of a viewpoint and the line-of-sight direction of the user according to the position and the posture of the head of the user wearing the head-mounted display 100, generates a display image in such a manner as to achieve a field of view that corresponds to the identified the position of the viewpoint and the line-of-sight direction of the user, and outputs the generated display image to the head-mounted display 100. For example, the image generation device 200 may generate a display image representing a virtual world serving as a stage of an electronic game while allowing the electronic game to progress, or generate a moving image for the purpose of appreciation or information provision, irrespective of whether for a virtual world or the real world. Further, the image generation device 200 may cause the head-mounted display 100 to display a panoramic image having a wide angle of view that is centered on the user's viewpoint, whereby it is possible to impart the user with a deep sense of immersion into the display world. It is to be noted that the image generation device 200 may be a stationary game console or a personal computer (PC).

The controller 140 is a controller (e.g., a game controller) that is gripped by a user's hand and that receives input of user's operation for control of image generation in the image generation device 200 and image display on the head-mounted display 100. The controller 140 is connected to the image generation device 200 by wireless communication. As a modified example, one of or both the head-mounted display 100 and the controller 140 may be connected to the image generation device 200 by wired communication via a signal cable or the like.

Figure 3:
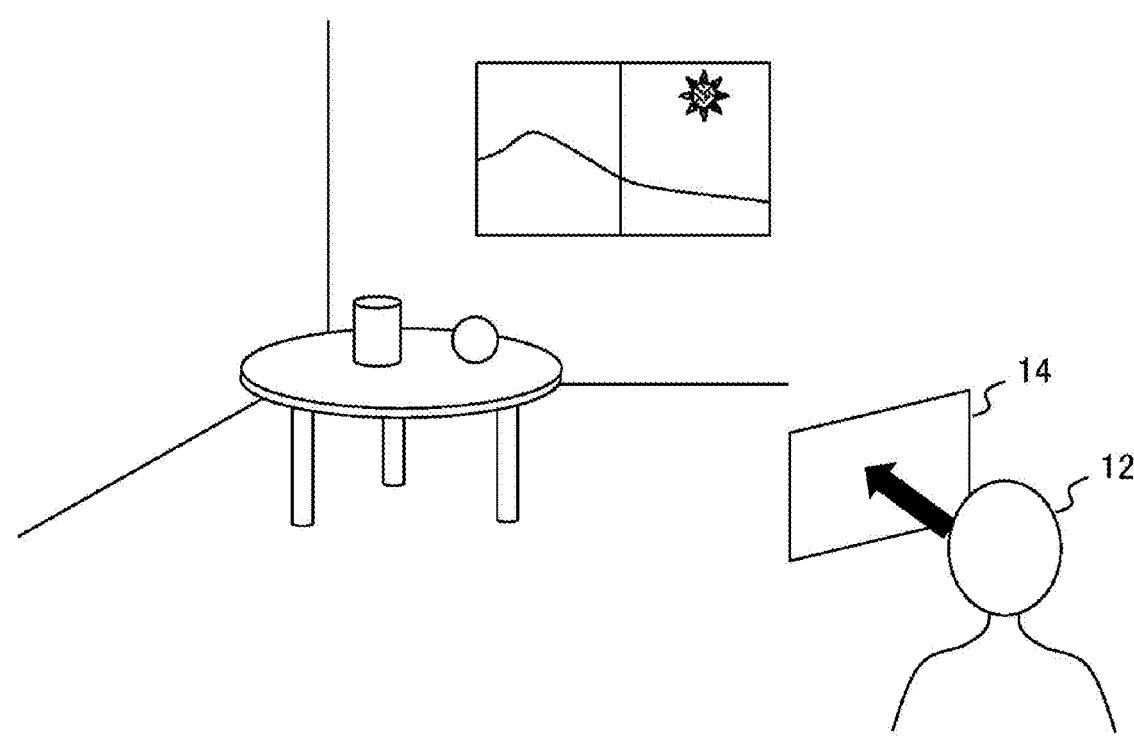
FIG. 3 is a view for describing an example of an image world that an image generation device causes the head-mounted display to display in the embodiment.

FIG. 3 is a view for describing an example of an image world that the image generation device 200 causes the head-mounted display 100 to display. The example of FIG. 3 creates a situation where a user 12 is in a room that is a virtual space. As depicted in FIG. 3, objects such as walls, a floor, a window, a table, and things on the table are disposed in a world coordinate system that defines the virtual space. For the world coordinate system, the image generation device 200 defines a view screen 14 according to the position of the viewpoint and the line-of-sight direction of the user 12, and represents images of the objects therein to draw a display image.

The image generation device 200 acquires a state of the head-mounted display 100 at a predetermined rate, and causes the position and the posture of the view screen 14 to change according to the acquired state. This enables the head-mounted display 100 to display an image in the field of view corresponding to the user's viewpoint. Further, if the image generation device 200 generates stereo images with parallax and displays the respective stereo images in the left and right regions of the display panel of the head-mounted display 100, it is also possible to allow the user 12 to stereoscopically view a virtual space. This enables the user 12 to experience virtual reality as if the user 12 were in the room that is in the display world.

In order to achieve such an image representation as illustrated in FIG. 3, it may be required to track the head of the user, thus, the changes in the position and the posture of the head-mounted display 100 and then control the position and the posture of the view screen 14 according to the tracked changes, with high accuracy. Further, since the user wearing the non-transmissive head-mounted display is unable to view the surroundings in the real space, it may be necessary to provide means to be used for avoidance of risks such as collision and stumbling. In the present embodiment, images captured by the stereo camera 110, which are used for achieving video see-through and AR described above, are used to acquire necessary information regarding real objects with high efficiency and low latency.

An image used for display, such as video see-through display, is preferably captured in a wide angle of view adequate for covering the human field of view. The image captured in the above situation contains most of the information regarding the real objects surrounding the user and information regarding, for example, the position and the posture of the user's head with respect to the real objects. Accordingly, the present embodiment is configured to cut out a necessary portion of the captured image according to an intended purpose, use the cut-out portion for image analysis, and thus efficiently acquire necessary information without having to employ a separate dedicated sensor. Incidentally, in the following description, at least either the position or the posture of the head-mounted display 100 may be generically referred to as the "state" of the head-mounted display 100.

Visual SLAM is known as the technology of simultaneously estimating a self-position of a mobile body equipped with a camera and creating an environmental map with use of captured images. FIG. 4 is a diagram outlining the principle of Visual SLAM. A camera 22 is mounted on a mobile body to capture a moving image of the real space 26 within the field of view while changing the position and the posture of the camera 22. Now, assuming that feature points 28*a* and 28*b* indicating a point 24 on the same subject are respectively extracted from a frame 20*a* captured at a specific time point and a frame 20*b* captured with a time lag of Δt.

A difference in position coordinate between the corresponding feature points 28*a* and 28*b* in individual frame planes (hereinafter may be referred to as the "corresponding points") depends on the change in the position and the posture of the camera 22 which occurs with the time lag of Δt. More specifically, when the matrices representing the amounts of change caused by rotational motion and translational motion of the camera 22 are R and T, respectively, and the three-dimensional vectors between the camera 22 and the point 24 at the two different time points are P1 and P2, respectively, the following relational expression is established.

$$P1 = R \cdot P2 + T$$

When the above relation is used to extract a plurality of corresponding points of two frames captured at different time points and solve a simultaneous equation, it is possible to identify the change in the position and the posture of the camera 22 that has occurred between the different time points. Further, when a process of minimizing an error in a result of derivation by recursive computation is performed, it is possible to accurately build three-dimensional information regarding a subject surface in the real space 26, such as the point 24. Incidentally, in a case in which the stereo camera 110 is used as the camera 22, the three-dimensional position coordinates of, for example, the point 24 are determined on an individual time point basis. This makes it easier to perform computation, for example, for extracting the corresponding points.

However, even in a case in which a monocular camera is used as the camera 22, an algorithm of visual SLAM is established. Consequently, when an intended purpose is to track the state of the head-mounted display 100, the camera included in the head-mounted display 100 is not limited to the stereo camera 110. Further, any one of a large number of algorithms proposed for Visual SLAM may be adopted. In any case, according to the depicted principle, the change in the state of the camera 22 from a preceding time point can be derived at the same rate as the frame rate of a moving image.

Meanwhile, according to movement with such a short period of time, a change on the image also becomes small accordingly. Thus, if the effective number of feature points has been obtained in each frame, it is sufficient to carry out tracking of the state of the real object, without performing analysis on the frames in whole. As a result, cutting out an appropriate region to be used for analysis allows both the tracking accuracy and the processing speed to be enhanced.

In view of this, according to the present embodiment, by way of example, in state acquisition of the head-mounted display 100 and setting of the play area which defines a range of the real world in which the user can move, which are to be used for setting the view screen 14, a portion of the captured image captured by the stereo camera 110 is cut out and used. Here, the play area is a range of the real world in which the user who views the virtual world through the head-mounted display 100 can move around, and for example, a range in which safe movement is ensured without any collision against objects around the user.

FIG. 5 illustrates an internal circuit configuration of the image generation device 200. The image generation device 200 includes a central processing unit (CPU) 222, a graphics processing unit (GPU) 224, and a main memory 226. These components are interconnected through a bus 230. The bus 230 is further connected to an input/output interface 228. The input/output interface 228 is connected to a communication section 232, a storage section 234, an output section 236, an input section 238, and a recording medium drive section 240.

The communication section 232 includes peripheral device interfaces such as a universal serial bus (USB) and an Institute of Electrical and Electronics Engineers (IEEE) 1394, and a network interface such as a wired local area network (LAN) or a wireless LAN. The storage section 234 includes a hard disk drive, a nonvolatile memory, or the like. The output section 236 outputs data to the head-mounted display 100. The input section 238 accepts input of data from the head-mounted display 100, and also accepts input of data from the controller 140. The recording medium drive section 240 drives a removable recording medium such as a magnetic disk, an optical disk, or a semiconductor memory.

The CPU 222 provides overall control of the image generation device 200 by executing an operating system stored in the storage section 234. In addition, the CPU 222 executes various programs (for example, a VR game application or the like) that have been read out from the storage section 234 or a removable recording medium and loaded into the main memory 226, or downloaded via the communication section 232. The GPU 224 has a function of a geometry engine and a function of a rendering processor. In accordance with a drawing command from the CPU 222, the GPU 224 performs a drawing process and outputs a drawing result to the output section 236. The main memory 226 includes a random access memory (RAM), and stores data or a program that is necessary for processing.

FIG. 6 depicts an internal circuit configuration of the head-mounted display 100. The head-mounted display 100 includes a CPU 120, a main memory 122, a display section 124, and an audio output section 126. These components are interconnected via a bus 128. The bus 128 is further connected to an input/output interface 130. The input/output interface 130 is connected to a communication section 132 including an interface for wireless communication, a motion sensor 134, and a stereo camera 110.

The CPU 120 processes the information acquired from the components of the head-mounted display 100 via the bus 128 and supplies the audio output section 126 or the display section 124 with audio data or a display image obtained from the image generation device 200. The main memory 122 stores data or a program necessary for processing by the CPU 120.

The display section 124 includes a display panel such as a liquid crystal panel or an organic electroluminescent (EL) panel and displays an image in front of the eyes of the user wearing the head-mounted display 100. The display section 124 may display a pair of stereo images in the panel regions corresponding to the right and left eyes to thereby achieve stereoscopic vision. The display section 124 may further include a pair of lenses that are positioned between the display panel and the eyes of the user wearing the head-mounted display 100 and that are used to expand a viewing angle of the user.

The audio output section 126 includes speakers or earphones positioned where the use's ears are located when the head-mounted display 100 is worn by the user, allowing the user to hear sounds. The communication section 132 is an interface that transmits and receives data to and from the image generation device 200. For example, the communication section 132 may be implemented by use of a known wireless communication technique such as Bluetooth (registered trademark). The motion sensor 134 includes an acceleration sensor and a gyro sensor and obtains the angular velocity and the acceleration of the head-mounted display 100.

As depicted in FIG. 1, the stereo camera 110 has a pair of video cameras that capture, from left and right viewpoints, an image of the surrounding real space by the field of view corresponding to the user's viewpoint. In a frame of the moving image captured by the stereo camera 110, an object that is present in the line-of-sight direction of the user (typically, in front of the user) appears. Values measured by the motion sensor 134 and captured image (camera image) data acquired by the stereo camera 110 are transmitted as needed to the image generation device 200 through the communication section 132.

As described above, the image display system 10 according to the embodiment sets a play area of the user who wears the head-mounted display 100, the play area defining a real-world range where the user is able to move while playing an application. In a case in which, while playing the application, the user attempts to leave the play area or has left the play area, the image display system 10 presents a warning to the user in order to call a user's attention or prompt the user to return to the play area.

Figure 7:
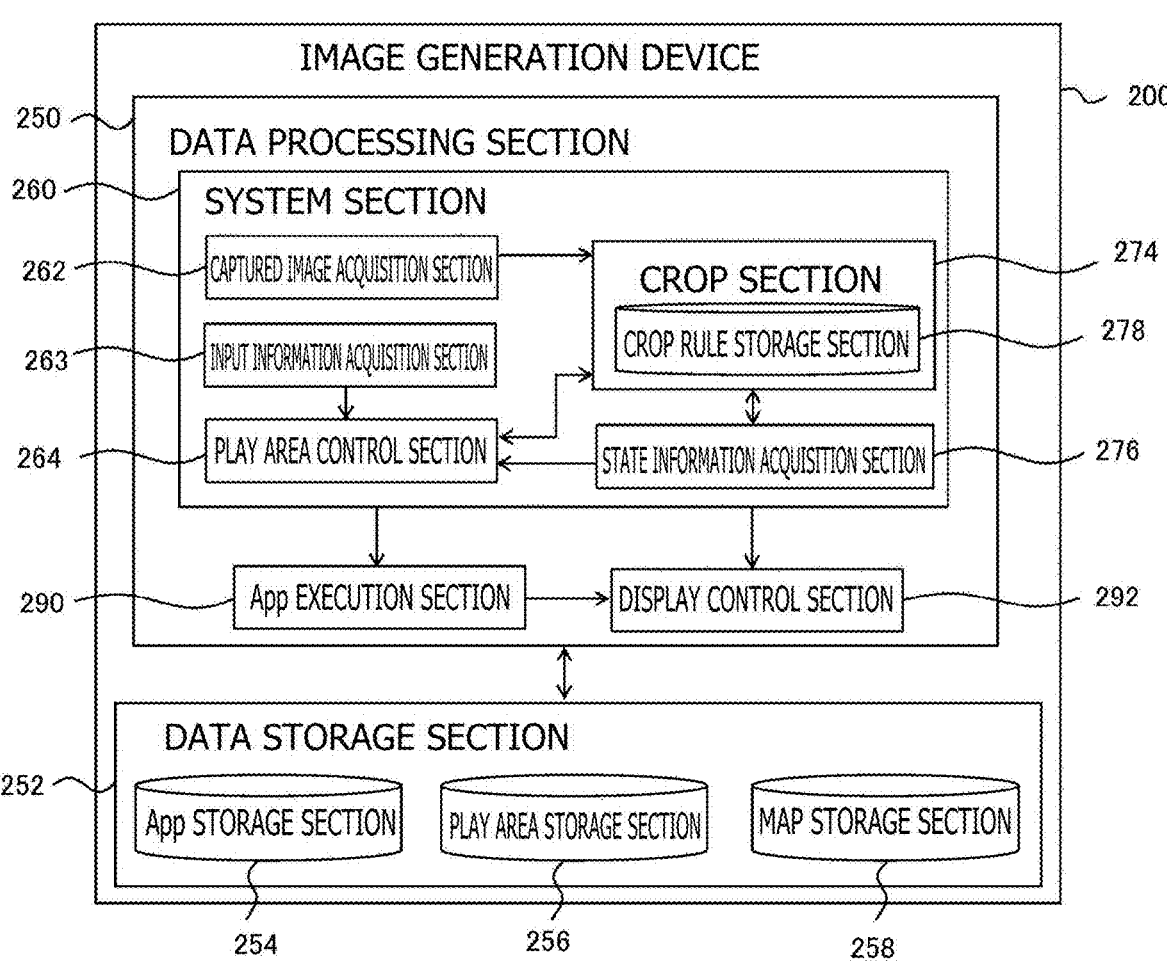
FIG. 7 is a block diagram illustrating functional blocks of the image generation device according to the embodiment.

FIG. 7 is a block diagram illustrating functional blocks of the image generation device. As described above, the image generation device 200 executes typical types of information processing such as proceed of electronic games or communication with a server, and FIG. 7 particularly illustrates the functional blocks relating to processing of the captured image by the stereo camera 110 in detail. It is to be noted that at least some of the functions of the image generation device 200 illustrated in FIG. 6 may be implemented in the head-mounted display 100 or in a server connected to the image generation device 200 through the network. Further, one of the functions of the image generation device 200 to cut out (crop) a frame of the captured image and obtain a predetermined piece of information may be achieved as a separate information processing device.

A plurality of functional blocks illustrated in FIG. 7 can be implemented by hardware including the CPU 222, the GPU 224, the main memory 226, and the storage section 234 illustrated in FIG. 5 and can be implemented by software including a computer program having the functions of the plurality of functional blocks. Thus, it will be understood by those skilled in the art that the functional blocks may be variously implemented by hardware only, by software only, or by a combination of hardware and software. The method for implementing the functional blocks is not particularly limited to any one of them.

The image generation device 200 includes the data processing section 250 and the data storage section 252. The data processing section 250 executes various types of data processing. The data processing section 250 transmits and receives data to and from the head-mounted display 100 and the controller 140 through the communication section 232, the output section 236, and the input section 238 depicted in FIG. 5. The data storage section 252 is realized by the storage section 234 illustrated in FIG. 5 and stores data that is referenced or updated by the data processing section 250.

The data storage section 252 includes an App storage section 254, a play area storage section 256, and a map storage section 258. The App storage section 254 stores a program, data on the object model, and the like which are required for execution of an application involving image display, such as a VR game. The play area storage section 256 stores data regarding the play area. The data regarding the play area includes data indicating the position of a point cloud that forms the boundary of the play area (e.g., coordinate values of individual points in the world coordinate system).

The map storage section 258 stores registration information for acquiring the position and the posture of the head-mounted display 100, that is, the position of the head of the user who wears the head-mounted display 100. More specifically, the map storage section 258 stores data of a keyframe used for Visual SLAM and data regarding the environmental map indicating the structure of an object surface in the three-dimensional real space (hereinafter referred to as the "map") in association with each other.

The keyframe is data of a frame that is selected according to predetermined criteria from among the frames from which the feature points are extracted with Visual SLAM. The predetermined criteria represent that, for example, the number of feature points is equal to or greater than a predetermined value. As described above, however, the term "frame" may be a part of the region that is cropped out of the whole region of a frame of a moving image captured by the stereo camera 110 in accordance with predetermined rules. In the following description, the part of the region may also be referred to as the "frame." When the keyframe is regarded as a "previous frame" and used for collation with the feature points of a current frame (the latest frame), it is possible to cancel errors that have been accumulated over time during the tracking of the position and the posture of the head-mounted display 100.

Map data includes information regarding the three-dimensional position coordinates of a point cloud representing a surface of an object being present in the room where the user is playing the electric game. Individual points are associated with the feature points extracted from the keyframe. Data of the keyframe is associated with the state of the stereo camera 110 at the time of keyframe data acquisition. The number of feature points to be included in the keyframe may be 24 or more. The feature points may include corners detected by a publicly-known corner detection method, and may be detected on the basis of the gradient of luminance.

The data processing section 250 includes a system section 260, an App execution section 290, and a display control section 292. The functions of the plurality of functional blocks may be implemented by a computer program. A CPU 222 and a GPU 224 of the image generation device 200 may exert the functions of the above-mentioned plurality of functional blocks by loading the above-mentioned computer program into the main memory 226 from the storage section 234 or a recording medium and executing the loaded computer program.

The system section 260 executes system processing regarding the head-mounted display 100. The system section 260 provides a common service to a plurality of applications (e.g., VR games) for the head-mounted display 100. The system section 260 includes a captured image acquisition section 262, an input information acquisition section 263, a crop section 274, a state information acquisition section 276, and a play area control section 264.

The captured image acquisition section 262 sequentially acquires pieces of frame data of an image captured by the stereo camera 110, which are transmitted from the head-mounted display 100. The acquired frame data is basically wide-angle image data that can be used for display. The input information acquisition section 263 acquires the description of a user operation through the controller 140. The crop section 274 operates such that a region necessary for processing to be performed at a subsequent stage is cropped out of a frame acquired by the captured image acquisition section 262.

The crop section 274 includes a crop rule storage section 278 therein. The crop rule storage section 278 stores a crop rule in which usage of a cropped image and a rule determining a region to be cropped are associated with each other. The crop section 274 crops each frame, in response to requests from the state information acquisition section 276 and the play area control section 264, in accordance with the crop rule corresponding to relevant processing executed in each of the sections.

It is to be noted that an image cropped by the crop section 274 is not only used for acquiring the state information regarding the head-mounted display 100 and setting the play area, but may also be used for performing additional image analysis, such as image recognition, or used for generating the display image. Further, the functional blocks, such as some of the functional blocks of the state information acquisition section 276 and the play area control section 264, for making an image analysis by using a cropped image, may be collectively referred to as an "image analysis section." In this case, the image analysis section has such a feature that the cropped image by the crop section 274 is used to acquire data necessary for displaying an image other than a video-see-through image on the head-mounted display 100.

The state information acquisition section 276 sequentially acquires the state information regarding the head-mounted display 100 by the above-mentioned Visual SLAM method. More specifically, the state information acquisition section 276 acquires the information regarding the state of the head-mounted display 100, that is, the information regarding the position and the posture of the head-mounted display 100, at each time point, according to, for example, data of each cropped frame, which is supplied from the crop section 274, and data stored in the map storage section 258. Alternatively, the state information acquisition section 276 may obtain the state information by integrating the information derived from image analysis with a measurement value obtained by the motion sensor 134 built in the head-mounted display 100.

The state information regarding the head-mounted display 100 is used, for example, to set the view screen for application execution, perform processing for monitoring the user's proximity to the play area boundary, and perform processing for warning against the user's proximity to the play area. Consequently, depending on the encountered situation, the state information acquisition section 276 provides the acquired state information as needed to the play area control section 264, the App execution section 290, and the display control section 292.

The play area control section 264 sets, as the play area, a real-space region where the user can move safely, and then presents a warning as needed when the user is in proximity to the boundary of the play area at a stage of application execution. When setting the play area, the play area control section 264 generates map data by performing, for example, Visual SLAM on the data of each cropped frame, which is supplied from the crop section 274.

For example, the play area control section 264 gives the user who wears the head-mounted display 100 an instruction to look around the surroundings. Accordingly, the real objects around the user such as furniture, a wall, and a floor are captured by the stereo camera 110. The play area control section 264 sequentially acquires data of the cropped region that is cropped out of each frame of the captured image and generates map data on the basis of the acquired data.

Also, the play area control section 264 references the generated map data to automatically determine, as the play area, a range of a floor surface where no collision occurs, for example, with furniture or a wall. The play area control section 264 may cause the head-mounted display 100 to display an image depicting the boundary of the determined play area and may thus accept a user's editing operation on the play area. In this case, the play area control section 264 acquires the description of a user operation which is performed from the controller 140, through the input information acquisition section 263, and changes the shape of the play area according to the acquired description of the user operation.

The play area control section 264 eventually stores the data regarding the determined play area in the play area storage section 256. The play area control section 264 also stores the generated map data and the keyframe data acquired together with the generated map data in the map storage section 258 in association with each other in order to allow the state information acquisition section 276 to read out the stored data subsequently at an appropriate timing.

The App execution section 290 reads out the data regarding a user-selected application, such as a VR game, from the App storage section 254, and then executes the read-out data. In this instance, the App execution section 290 sequentially acquires the state information regarding the head-mounted display 100 from the state information acquisition section 276, sets the position and the posture of the view screen according to the acquired state information, and draws a VR image. As a result, the virtual world of a display target can be represented in the field of view corresponding to the movement of the user's head.

Further, depending on the user-selected application, the App execution section 290 may also generate an AR image. In this case, the App execution section 290 draws a virtual object by superimposing it on a frame of a captured image acquired by the captured image acquisition section 262 or on a frame cropped by the crop section 274 as appropriate for display processing. In this instance, the App execution section 290 determines the drawing position of the virtual object according to the state information acquired by the state information acquisition section 276. As a result, the virtual object is properly represented to match a subject appearing in the captured image.

The display control section 292 sequentially transmits pieces of frame data of various images generated by the App execution section 290, such as a VR image and an AR image, to the head-mounted display 100. Further, when the play area is set, the display control section 292 transmits, as needed, to the head-mounted display 100, an image instructing the user to look around, an image depicting the state of a tentatively determined play area and accepting an editing operation, or an image warning against a user's proximity to the play area boundary, for example.

For example, when the play area is set, according to a request from the play area control section 264, the display control section 292 transmits, to the head-mounted display 100, data of a frame of a captured image acquired by the captured image acquisition section 262 or data of a frame cropped by the crop section 274 as appropriate for display processing, and causes the head-mounted display 100 to display the transmitted data. As a result, video see-through is achieved to enable the user to view the real space in the direction in which the user faces as it is. Accordingly, the safety of the user is increased. It is to be noted that the opportunity for achieving video see-through is not limited to the above. Video see-through may be achieved in various situations, such as a period during which the user is away from the play area, before the start or after the end of an application, or a case in which video see-through is requested by the user.

Figure 8:
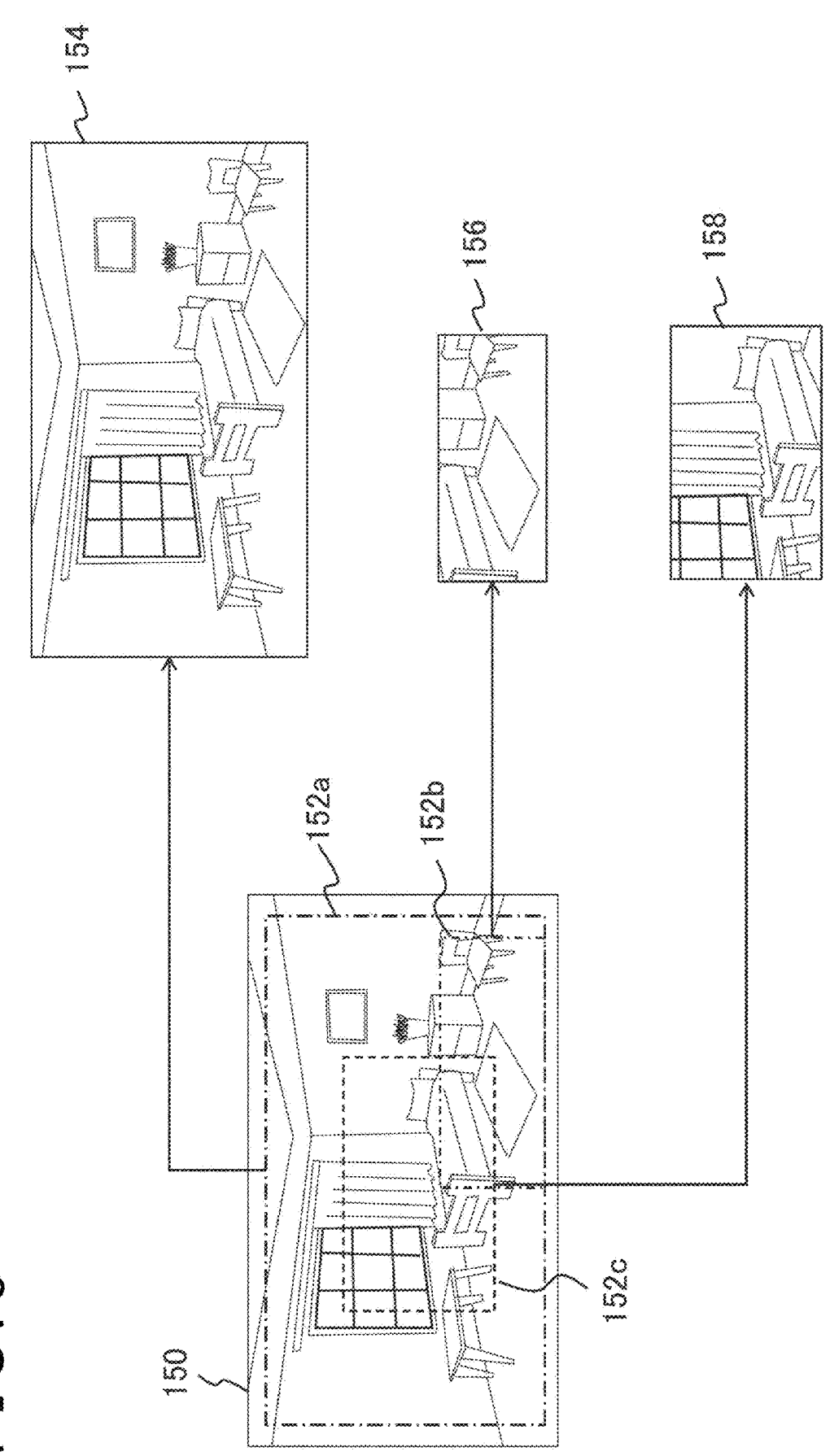
FIG. 8 is a view illustrating change in an image that is performed by a crop section according to the embodiment.

FIG. 8 is a view illustrating change in an image that is performed by the crop section 274. As has been described so far, the stereo camera 110 captures the real space in a direction in which the user faces, with a wide angle where a horizontal angle of view is substantially 100° or greater. A frame 150 represents a frame of one of a pair of stereo moving images thus obtained, and a situation of the room where the user is present appears in the frame 150.

In a case in which video see-through is to be achieved, the frame 150 acquired by the captured image acquisition section 262 may be set to be a display image 154 without being cropped by the crop section 274. Alternatively, as illustrated in the figure, the crop section 274 may crop a region 152a having a peripheral edge region with a predetermined width excluded therefrom and set the cropped region 152a as the display image 154. In any case, the display control section 292 performs appropriate correction on the frame 150 or the display image 154 and transmits the corrected one as a final display image data to the head-mounted display 100.

For example, as illustrated in FIG. 1, in a case in which the stereo camera 110 may be provided on the lower front surface of the housing 108 of the head-mounted display 100 and therefore the direction of the optical axis is not aligned with the line of sight of the user, if the image is displayed in this state, there may be a possibility of providing the user with a feeling of discomfort. Thus, the display control section 292 performs conversion processing on the frame 150 or the display image 154 in such a manner as to obtain an angle of view corresponding to the field of view of the user. Further, the display control section 292 may perform correction for applying, to the image, distortion opposite to distortion aberration and the color aberration of the eyepiece lens such that the image having no distortion and color deviation when the user appreciates the image through the eyepiece lens included in the head-mounted display 100 is visually recognized.

Meanwhile, in a case in which a play area is set, the crop section 274 crops a region 152b in which the floor surface appears and then provides the cropped region 152b as the image 156 for play area setting, to the play area control section 264. This is because, as for the play area setting, in a three-dimensional map generated by the play area control section 264, it is required to first detect the floor surface and then detect a wall, furniture, or the like around the user, in reference to the detected floor surface.

Further, in a case in which the state information regarding the head-mounted display 100 is acquired, the crop section 274 crops a region 152c having a predetermined size, the region 152c corresponding to approximately the front of the head-mounted display 100, and then, supplies the cropped region 152c to the state information acquisition section 276 as an image 158 for state information acquisition. The phrase "approximately the front of the user" signifies a range of a predetermined size including the line-of-sight direction of the user, for example. The image 158 including images of objects in approximately front of the head-mounted display 100 is less likely to include an image of a uniform plane such as a floor surface or a ceiling, and is more likely to have many feature points. Thus, the state information regarding the head-mounted display 100 is continuously acquired with stable accuracy.

As described above, optimizing the position and the size of the cropped region according to an intended purpose allows a plurality of pieces of information to be acquired with higher accuracy even with the stereo camera 110 only provided as means. Further, even if the angle of view of the stereo camera 110 is enlarged on the assumption that the image may be displayed, the size of the image to be processed for the play area setting or the acquisition of the state information regarding the head-mounted display 100 is not affected, so that it does not take extra time for processing and it is possible to achieve both high accuracy and low latency.

Figure 9:
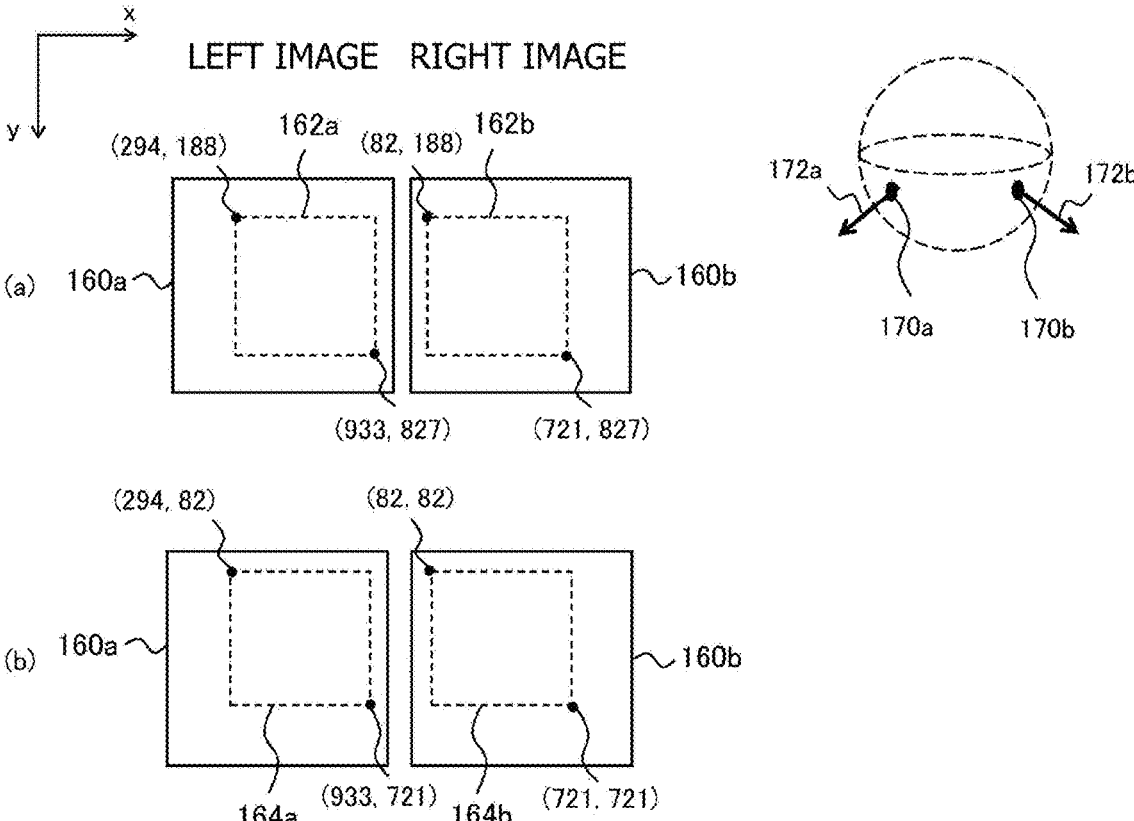
FIG. 9 depicts views each illustrating a more detailed example of a region to be cropped in the embodiment.

FIG. 9 is a view illustrating a more detailed example of a region to be cropped. A pair of solid rectangles illustrated in each of Subfigures (a) and (b) of FIG. 9 represent a pair of stereo image frames (a left image 160a and a right image 160b), respectively. Subfigure (a) illustrates regions 162a and 162b to be cropped for play area setting, and Subfigure (b) illustrates regions 164a and 164b to be cropped for acquiring the state information regarding the head-mounted display 100.

In this example, as illustrated on the right side of FIG. 9, two cameras 170a and 170b constituting the stereo camera 110 are assumed to be mounted in such a state that optical axes 172a and 172b of the cameras 170a and 170b are not aligned with the user's line-of-sight direction which is directed toward a side of a person seeing the illustration of FIG. 9. More specifically, it is assumed that the cameras 170a and 170b are mounted in the head-mounted display 100 such that the optical axes 172a and 172b are oriented outward in the horizontal direction to form an angle of 30° and are both oriented 35° downward from the horizontal plane. Meanwhile, in order to identify the position of a point on a subject surface by performing stereo matching through the use of Visual SLAM, it is necessary to use stereo images with parallel optical axes.

Accordingly, the optical regions 162a and 162b for play area setting in Subfigure (a) are in laterally inward ranges of the left image 160a and the right image 160b of the original pair of stereo image frames. Specifically, in the left image 160a, the region 162a displaced rightward from the center is the most appropriate cropped region, and in the right image 160b, the region 162b displaced leftward from the center is the most appropriate cropped region. Meanwhile, in a vertical direction, the regions 162a and 162b are located in the substantially centers of the left image 160a and the right image 160b, respectively.

This is because the optical axes 172a and 172b of the cameras 170a and 170b are oriented slightly downward and therefore the floor surface that is important for play area setting is highly likely to appear in the vicinity of the center in the vertical direction. In addition, excluding portions close to lower ends of the left image 160*a* and the right image 160*b* from the regions 162*a* and 162*b* also prevents the body of the user from appearing in the display image.

As in Subfigure (b), the most appropriate regions 164*a* and 164*b* for acquiring the state information are in laterally inward ranges of the left image 160*a* and the right image 160*b* of the original pair of stereo image frames. Meanwhile, the regions 164*a* and 164*b* are displaced upward from the centers of the left image 160*a* and the right image 160*b* in the vertical direction, respectively. This is because the optical axes 172*a* and 172*b* of the cameras 170*a* and 170*b* are orientated downward and objects in front of the head-mounted display 100 are highly likely to appear in a range displaced slightly upward.

By way of example, in FIG. 9, the pixel count of each of the original pair of stereo image frames (the left image 160*a* and the right image 160*b*) is set to be 1016×1016, and with the upper left of the original stereo images as the origin, the position coordinates on the upper left corner and the lower right corner of each of the crop target regions 162*a*, 162*b*, 164*a*, and 164*b* are indicated. More specifically, at the time of play area setting illustrated in Subfigure (a), the rectangular region 162*a* having the position coordinates (294,188) and (933,827) of the left image 160*a* set to the upper left vertex and the lower right vertex, respectively, and the rectangular region 162*b* having the position coordinates (82,188) and (721,827) set to the upper left vertex and the lower right vertex of the right image 160*b*, respectively, are cropped.

At the time of acquiring the state information illustrated in Subfigure (b), the rectangular region 164*a* having the position coordinates (294,82) and (933,721) of the left image 160*a* set to the upper left vertex and the lower right vertex, respectively, and the rectangular region 164*b* of the right image 160*b* having the position coordinates (82,82) and (721,721) set to the left lower vertex and the lower right vertex, respectively, are cropped.

The crop rule storage section 278 thus stores pieces of information such as the position coordinates representing the region which is to be cropped and which has been optimized for each intended purpose, in association with each intended purpose. When the region is optimized, on the basis of the orientations of the optical axes 172*a* and 172*b* of the cameras 170*a* and 170*b* as described in the figure, a region in which a necessary image appears may be obtained by calculation, or a region in which a necessary image is highly likely to appear may be obtained by experiment.

The crop section 274 crops a region corresponding to each intended purpose according to requests from the play area control section 264 and the state information acquisition section 276 and sequentially supplies the cropped data thereto. It is to be noted that the cropped data may be requested by the App execution section 290 or the display control section 292. Thus, display using the captured image can efficiently be performed by use of a necessary region only.

It is to be noted that a mode of mounting the stereo camera 110 illustrated, the resolution and the size of a frame of the captured image, and the position and the size of the cropped region are merely examples, and they are not intended to limit the gist of the present embodiment. For example, in this figure, the cropped region is fixed in consideration of the height at which the floor surface may appear in the image, but according to a circumstance at each time point and an actual image, the crop section 274 may determine an appropriate cropped region. By way of example, a range of the region in which the floor surface appears tends to be different between an application assuming that the user sits to appreciate the display image and an application assuming that the user stands to appreciate the display image, and the range in the former application tends to be wide.

Accordingly, the crop section 274 may acquire, from the App execution section 290, a characteristic of the application being executed, and in the case of the application assuming that the user sits, the cropped region may be further extended than in the case of application assuming that the user stands or may be displaced upward in the image plane. As a result, regardless of the posture of the user, it is highly likely that the floor and the objects thereon appear at the same time. The information obtained as the characteristic of the application such as not only the posture of the user, but also the tendency of the line of sight of the user, e.g., whether the user often sees the front side or sees the lower side thereof at the time of performing the application, can be used.

In these cases, the crop rule storage section 278 stores the characteristic of the application and information such as position coordinates representing a region to be cropped in advance, in association with each other for each intended purpose. The crop section 274 may also use a measurement value obtained by the motion sensor 134 included in the head-mounted display 100, when a region to be cropped is determined. In this case, the crop section 274 derives a region in which the floor surface is highly likely to appear, or the like, at each time point, on the basis of the posture of the head-mounted display 100 obtained by the relevant measurement value, and according to the result, may change the region to be cropped with time.

Alternatively, the crop section 274 may reduce the size of a region to be cropped at an initial stage of the play area setting, and after that, when the floor surface is detected, the crop section 274 may expand the relevant region such that an image of the floor surface is included in the relevant region. This makes it possible to efficiently collect more information regarding the floor surface and objects thereon. For example, in a case in which the change in the state of the head-mounted display 100 per unit time is smaller than a threshold, the crop section 274 expands the region to be cropped. Owing to this, more information such as the feature points can be easily obtained for a short period of time.

Once the floor surface is detected, the crop section 274 may estimate the posture of the user, e.g., whether the user is sitting or standing, in reference to the detected height of the floor surface, and may adjust, according to the estimated result, the size or the position of the region to be cropped as described above. In these cases as well, the crop rule storage section 278 stores, in advance, the rule for changing the cropped region and the conditions to be used therefor, in association with each other. It is to be noted that, as the number of analyses to be performed for one frame increases, it takes longer to acquire the result of analyses. As such, in the present embodiment, basically, image display is efficiently achieved with low latency by fixing or estimating a region in which a necessary image such as a floor surface is highly likely to be acquired.

FIG. 9 illustrates an example in which one region is cropped out of each of the left image 160*a* and the right image 160*b*, for one intended purpose, and the number of regions to be cropped out of each image is not limited to any specific number. For example, if a camera capable of capturing a whole-sky image is adopted, regions having a plurality of discrete angular ranges are cropped, whereby images similar to ones obtained by capturing the surroundings while rotating the camera are obtained. Accordingly, the crop section 274 may crop a plurality of regions determined in accordance with a predetermined rule out of one frame, for example.

In this case, the crop section 274 may set a plurality of regions having a predetermined number or more of feature points to be a crop target. The crop section 274 may estimate change in the position of the once determined crop target region under such rule, according to the preceding changes in the state of the head-mounted display 100 occurring thus far and determine a region to be cropped in the current frame.

Next, an operation of the image display system having the above configuration will be described. FIG. 10 is a flowchart indicating a procedure for allowing the image generation device 200 to execute various processes by use of a captured image. It is to be noted that the flowchart illustrated in FIG. 10 put a focus on classification of the processes performed by the crop section 274, and does not define the process order of play area setting or application execution. In addition, the flowchart illustrated in FIG. 10 is started at a desired timing at which communication between the image generation device 200 and the head-mounted display 100 is established and at least data of a captured image is transmitted from the head-mounted display 100.

The captured image acquisition section 262 of the image generation device 200 acquires data of a frame to be processed (step S10). At this point of time, if the mode of achieving video see-through is selected (Y in step S12), the display control section 292 performs necessary correction on the target frame, or the like, and generates a display image for video see-through to transmit the generated image to the head-mounted display 100 (step S14). As described above, the image generation device 200 sets the video see-through mode not only in a period before and after a period of executing the application and a period in which the user is away from the play area, but also in a period in which the user looks around the surroundings in order to set the play area.

The user can select play area initial setting or re-setting from a system setting menu of the head-mounted display 100. In a case in which the user selects the play area initial setting or the re-setting, the play area control section 264 causes the head-mounted display 100 to display a message prompting the user to look around the surroundings, through the display control section 292. In this manner, in a case in which a mode of setting the play area is selected (Y in step S16), the crop section 274 crops a region for play area setting out of the frame (step S18). The play area control section 264 sequentially acquires the cropped frame data to set the play area according to the acquired frame data (step S20).

Accordingly, data of the frame acquired in step S10 is used as a display image and is cropped to be used also to set the play area. In a case in which the mode of setting the play area is not selected (N in step S16), the steps in S18 and S20 are skipped. Meanwhile, in S12, if the mode of achieving video see-through is not selected (N in step S12), that is, in a period in which the image of the application is to be displayed, the crop section 274 crops a region for acquiring the state information regarding the head-mounted display 100, out of the frame (step S22).

The state information acquisition section 276 sequentially acquires the cropped frame data and uses the data to acquire the state information regarding the head-mounted display 100 through Visual SLAM (step S24). The relevant state information is sequentially supplied to the App execution section 290 to be used for generation of the display image and for a process of monitoring a positional relation between the user and the play area boundary in order that the play area control section 264 warns the user of the user's proximity to the play area boundary.

In any case, these images are transmitted to the head-mounted display 100 by the display control section 292 to be displayed thereon (step S26). If a predetermined end condition is not satisfied, for example, the execution is stopped by the user (N in step S28), the processes in steps S10 to S26 are repeated. If the predetermined end condition is satisfied (Y in step S28), the image generation device 200 ends all the processes.

FIG. 11 is a flowchart indicating a processing procedure for allowing the play area control section 264 to set a play area in step S20 of FIG. 10. First, the play area control section 264 acquires data of the cropped frame for play area setting from the crop section 274 (step S40). The play area control section 264 automatically detects the play area in the surrounding space of the user according to the acquired data of the cropped frame (step S42).

More specifically, the play area control section 264 estimates the three-dimensional shape of the room in which the user is present by using a publicly-known method such as the Visual SLAM method. When the Visual SLAM method is used, the above process corresponds to the generation of map data. Subsequently, on the basis of the estimated three-dimensional shape, the play area control section 264 detects, as the floor surface, a plane perpendicular to the direction of gravity that is indicated by a measurement value obtained by the motion sensor 134. Further, the play area control section 264 constructs the three-dimensional shape, relative to the floor surface, of an object on the floor surface as an aggregate of points corresponding to the feature points extracted from the frame.

The play area control section 264 determines the boundary of the play area according to the aggregate of points, and generates play area data including the position coordinates of the boundary. It is to be noted that, at the time of play area detection, the play area control section 264 derives the height of the floor surface as the play area. For example, a distance in the direction of gravity between the floor surface and the head-mounted display 100 may be used as the height of the floor surface. The play area control section 264 includes data indicating the height of the floor surface in the play area data. In a case in which the position of the head-mounted display 100 is the origin, the height of the floor surface may be minus one meter or the like.

The play area control section 264 checks whether all pieces of data related to three-dimensional space necessary for play area setting is acquired or not, and when such data acquisition is not achieved, the play area control section 264 repeats the process in step S42 for new frames (N in step S46, and steps S40 and S42). In this case herein, data necessary is data necessary for entirely completing play area setting, and is, for example, map data that covers the direction in which the user may possibly face and the direction in which the user is allowed to move. The play area control section 264 may perform step S46 by checking the distribution of the state of the stereo camera 110 in which the keyframe has been obtained.

When acquisition of the data necessary is achieved (Y in step S46), the play area control section 264 causes the map storage section 258 to store the map data and keyframe data acquired thus far (step S48). Next, the play area control section 264 accepts a user operation for play area adjustment (step S50). For example, the play area control section 264 generates a floor surface adjustment screen according to data indicating the height of the detected floor surface. The floor surface adjustment screen may include an AR image that is obtained by superimposing an object indicative of the floor surface (e.g., a translucent lattice-shaped object) on a captured image frame acquired by the captured image acquisition section 262.

The play area control section 264 causes the head-mounted display 100 to display the floor surface adjustment screen on the display panel thereof, through the display control section 292. The play area control section 264 accepts a user operation for floor surface height adjustment, which is input with respect to the floor surface adjustment screen, and changes the height of the floor surface according to the user operation. The play area control section 264 also generates a play area edit screen according to the data regarding the detected play area. The play area edit screen includes an AR image that is obtained by superimposing an object indicative of the play area on a captured image acquired by the captured image acquisition section 262.

The play area control section 264 causes the display panel of the head-mounted display 100 to display the play area edit screen. The play area control section 264 accepts a user's editing operation on the play area, which is input with respect to the play area edit screen, and changes the shape of the play area 62 according to the user's editing operation. Next, the play area control section 264 stores the data regarding the eventually determined play area in the play area storage section 256 (step S52). The data regarding the play area includes, for example, coordinate values of a point cloud representing a boundary.

Figure 12:
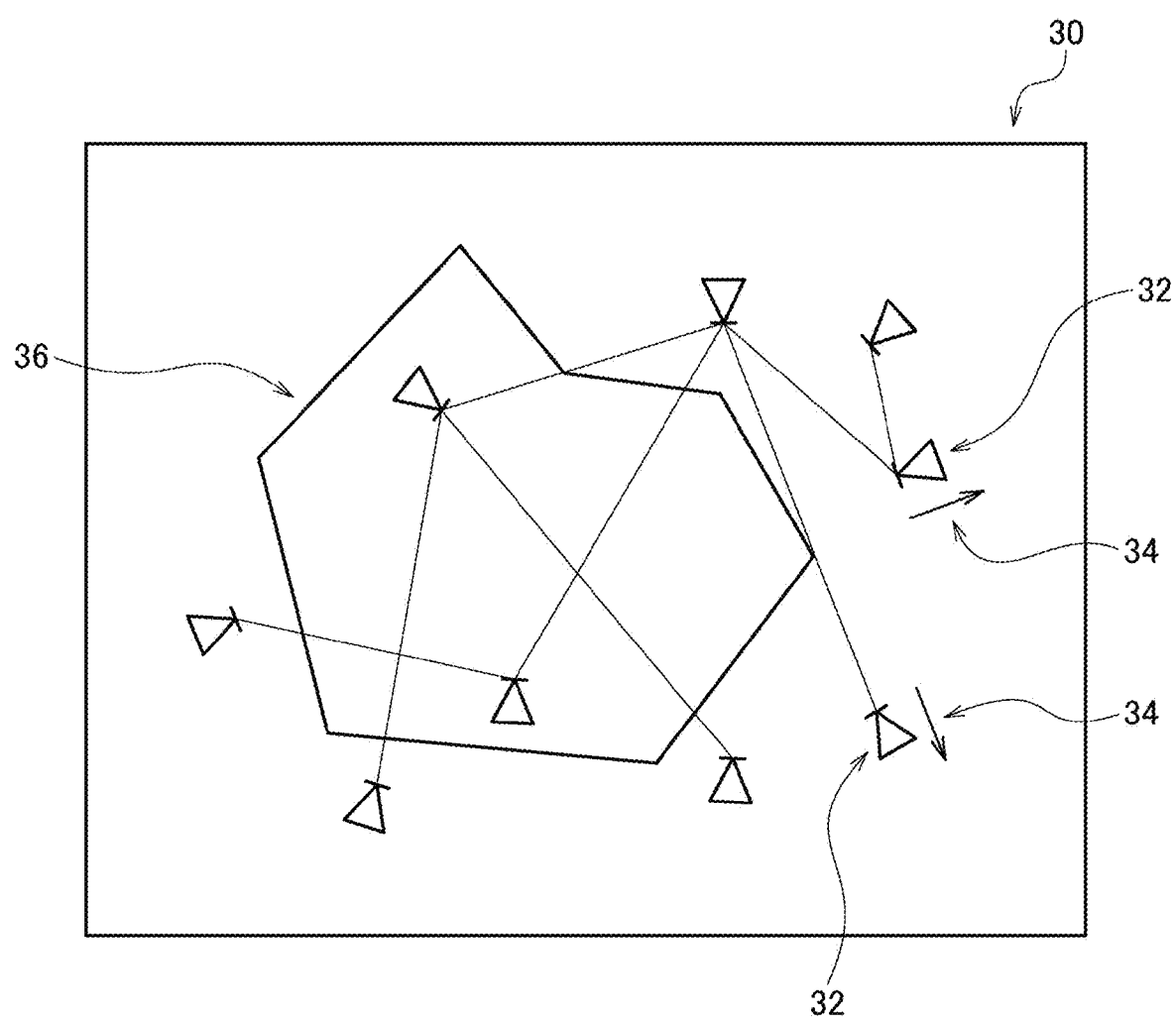
FIG. 12 is a view schematically illustrating an action of a user at the time of play area setting according to the embodiment.

FIG. 12 is a view schematically illustrating an action of a user at a time of play area setting. In the room 30, the user who wears the head-mounted display 100 on the head moves looking around the surroundings. In FIG. 12, the user 32 indicates the position of the user at this point of time. An arrow 34 indicates a line-of sight direction of the user. The play area 36 indicates an example of a play area to be set.

While the steps S40 and S42 in FIG. 11 are performed, the play area control section 264 causes the whole frame of the captured image acquired by the captured image acquisition section 262 to be displayed on the display panel of the head-mounted display 100 through the display control section 292, to achieve video see-through. As illustrated in FIG. 11, the user faces in various directions, and the captured image is transmitted from the head-mounted display 100, so that the play area control section 264 can construct the situation surrounding the user as three-dimensional map data. It is to be noted that output of the motion sensor 134 which is measured at the same time may also be used for the construction of the relevant data.

FIG. 13 is a diagram illustrating an image of a frame captured by the stereo camera 110, and data of a keyframe obtained from this image. It is to be noted that a pair of images captured by the stereo camera 110 for each frame are obtained in practice, but in FIG. 13, only one of the pair of the images is schematically illustrated. The play area control section 264 and the state information acquisition section 276 extract a plurality of feature points 44 included in the frame image 40 by a publicly-known corner detection method or the like.

The frame image 40 to be processed here is an image which is cropped by the crop section 274 for play area setting or for acquiring the state information. As described above, this cropped image is collated with a frame image obtained at a preceding time point, and corresponding points are obtained, whereby the state information of the stereo camera 110 at the time of capturing the frame image 40 is identified. After only a region which is estimated to be necessary is cropped out of the original frame, feature points are extracted, and it is possible to significantly enhance efficiency of these processes.

Meanwhile, in a case in which a predetermined number or more of feature points, for example, 24 or more of feature points are extracted from one frame image 40, the play area control section 264 and the state information acquisition section 276 set the relevant frame image 40 to be a key frame 42. The play area control section 264 and the state information acquisition section 276 generate data of the key frame 42 including position coordinates of the feature points (for example, the feature points 44) extracted from the selected frame image 40 in an image plane, and an image in a predetermined range surrounding the feature points. The play area control section 264 and the state information acquisition section 276 further associate the generated data with the state information of the stereo camera 110 at the time of capturing the frame image 40, and generate the final key frame data.

The play area control section 264 stores a plurality of references (referred to as "bins" hereinafter) for deriving a score regarding the percentage at which an area in the surrounding space of the user is covered by the input captured image (in the embodiment, the key frame generated from the captured image). A plurality of bins are a plurality of references obtained by dividing the surrounding space of the user by difference modes.

Figure 14:
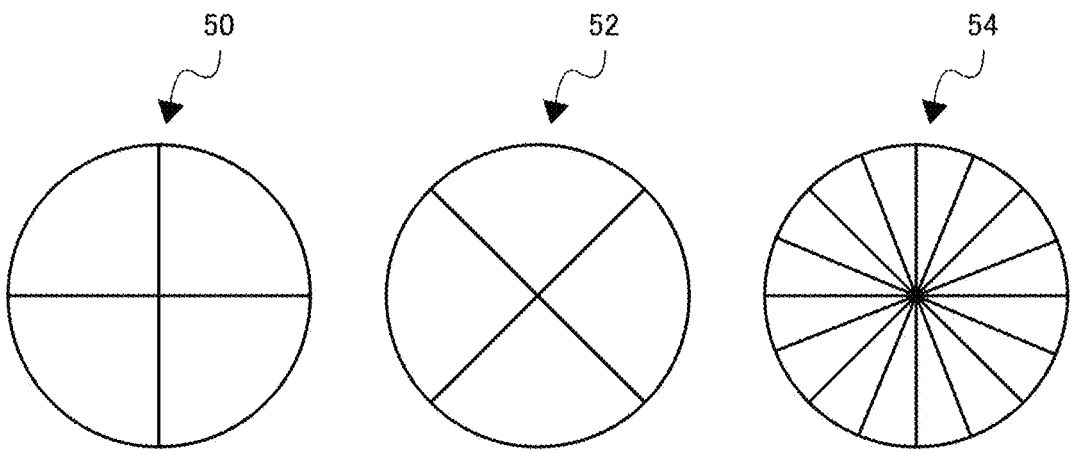
FIG. 14 is a view illustrating a plurality of bins to be usable for the present embodiment.

FIG. 14 illustrates a plurality of bins to be usable for the present embodiment. Each of a bin 50, a bin 52, and a bin 54 sets a center as the position of the user, and is obtained by dividing the surrounding space of the user with the direction of gravity as the axis. The bin 50 is a reference obtained by dividing the surrounding space of the user into four parts at the central angle of 90°, on the basis of the line-of-sight direction of the user at the time of starting the play area setting and the direction perpendicular to the line-of-sight direction. The bin 52 is obtained by phase-shifting the bin 50 by 45°. The bin 54 is a reference obtained by dividing the surrounding space of the user into 16 parts at the central angle of 22.5°. In the following description, an area that is defined by each of the bin 50, the bin 52, the bin 54 and that is obtained by dividing the surrounding space of the user is referred to as a "divided area."

The play area control section 264 derives a score regarding the percentage at which an area in the surrounding space of the user is covered by the input frame image (in the embodiment, the key frame generated from the captured image) on the basis of the bins 50, 52, and 54. In a case in which the derived score is equal to or greater than a predetermined threshold, for example, the play area control section 264 determines that data necessary for play area setting has been able to be acquired in step S46 of FIG. 11.

More specifically, in a case in which a key frame is generated from the captured image, the play area control section 264 identifies a division area which matches with the state of the head-mounted display 100 at the time of obtaining the relevant key frame, for each of the bins 50, 52, and 54. When the obtained key frame is a first key frame with respect to the identified division area, it is assumed that the identified division area has been filled, and the number of filled division areas is added to the score. When a new key frame is generated, the play area control section 264 adds the number of division areas newly filled in each of the bins to the score, according to a similar algorithm.

Then, when the score is less than a threshold "10," for example, the play area control section 264 determines that data necessary has not been acquired and continues the detection process of the play area. When the score is equal to or greater than the threshold "10," the play area control section 264 determines that data necessary has been acquired, and moves the process to a state for accepting adjustment by the user. The threshold "10" of the score is determined as a value that is able to be reached if the user wearing the head-mounted display 100 looks around the surroundings at 180° but that is not able to be reached if the user does not look around the surroundings.

It is to be noted that, as the angle of view of the stereo camera 110 is wider, an amount of information included in one frame is larger, whereby data necessary for detection the play area can be acquired with a smaller number of frames. As described above, if the crop section 274 crops a plurality of regions having different angle ranges out of an image captured at wide angles, it is possible to complete play area setting with minimum effort of the user looking around. In the present embodiment, the cropped region only is set as an analysis target, and accordingly, it is possible to reduce an influence on a period of time required for analysis even if the angle of view of the stereo camera 110 is widen.

Figure 15:
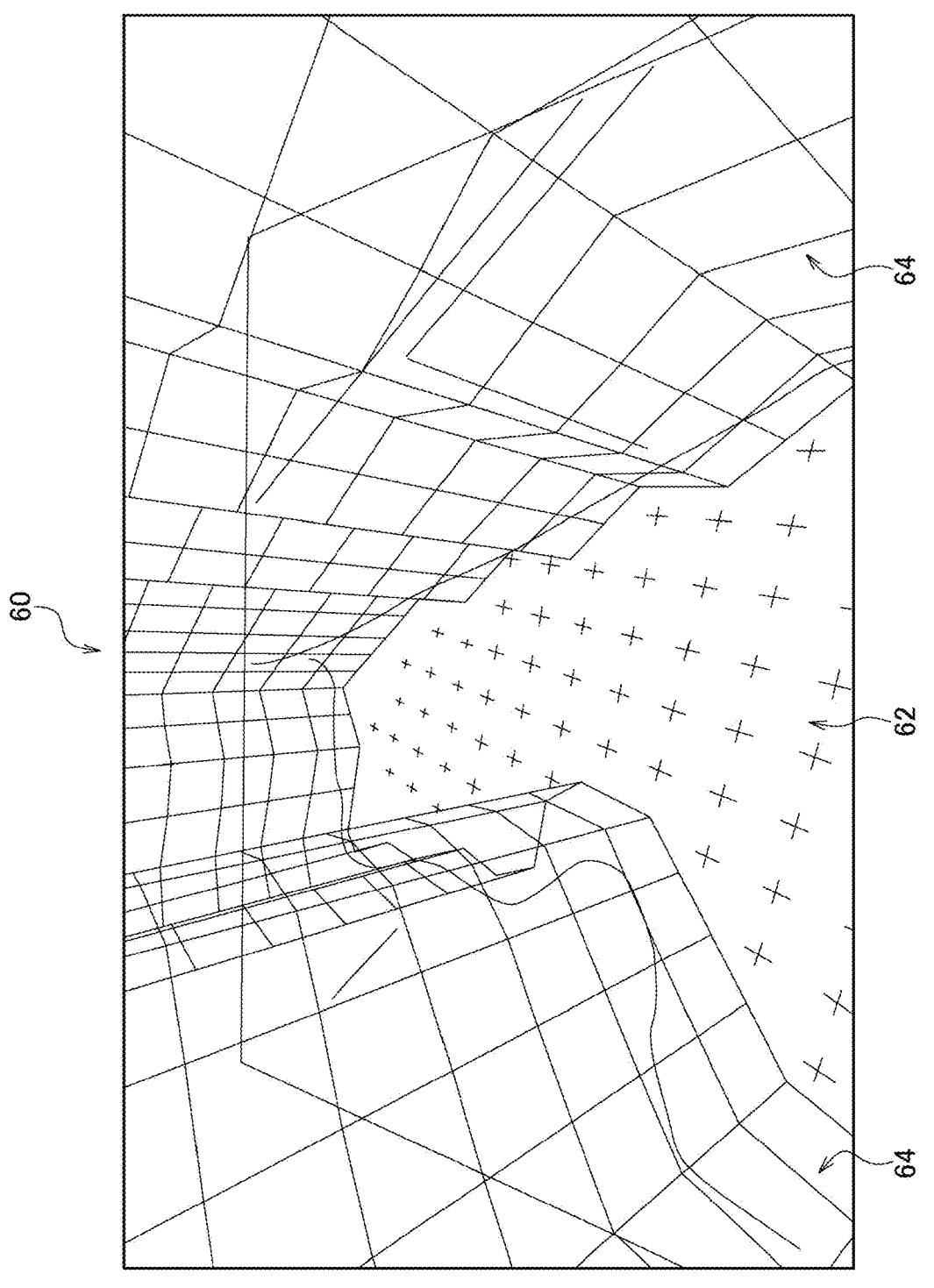
FIG. 15 is a view illustrating an example of a play area edit screen in the present embodiment.

FIG. 15 illustrates an example of a play area edit screen. The play area edit screen 60 includes a play area 62 and a boundary 64. The play area 62, which is an image depicting the play area (typically, a floor surface without obstacles), may be an image depicting, for example, a translucent lattice-shaped object. The boundary 64, which is an image depicting the boundary of the play area 62, is an image perpendicular to the play area at the boundary of the play area 62. The boundary 64 may also be, for example, a translucent lattice-shaped object.

The play area control section 264 acquires, for example, through the controller 140, the description of a user operation performed with respect to the play area edit screen to move the boundary 64 or expand or contract the play area 62. Eventually, when the user performs a confirmation operation, the play area control section 264 generates data indicating the resulting state of the play area as the final state, and stores the generated data in the play area storage section 256.

According to the present embodiment described above, an image captured by the stereo camera included in the head-mounted display is not only used for display purposes, such as video see-through display and AR display, but also used for image analysis. In such an instance, an optimal region is cropped and used in accordance with rules that are defined on the basis of contents of analysis and intended purposes. As a result, analysis can be made without sacrificing efficiency even when the angle of view of the stereo camera is expanded. According to this advantage, a stereo camera having a wide angle of view is adopted, so that it is possible to reduce an effort of the user looking around the surroundings at the time of play area setting.

An appropriate region according to an intended purpose, such as an image including the floor surface for play area setting or an image in front of the head-mounted display for acquisition of the state information of the head-mounted display, is cropped in consideration of the directions of the optical axes of the cameras. Accordingly, it is possible to cause resources to concentrate on an important portion, and to obtain information with high accuracy and low latency. Further, the above-described configuration eliminates the necessity of using a dedicated sensor for acquiring various types of information. Therefore, high-quality image representation is provided even when the adopted head-mounted display has a simple configuration. At the same time, the above-described configuration avoids degradation of the feeling of wearing the head-mounted display due to an increase in weight and power consumption.

The present invention has been described above in terms of the preferred embodiment. It will be understood by persons skilled in the art that the above-described preferred embodiment is illustrative and not restrictive, and that the combination of component elements and processes described in conjunction with the preferred embodiment may be variously modified without departing from the spirit and scope of the present invention.

INDUSTRIAL APPLICABILITY

As described above, the present invention can be used for an image generation device, a game console, a mobile terminal, a head-mounted display, or an image display system including at least any of them, for example.

REFERENCE SIGNS LIST

10: Image display system
100: Head-mounted display
200: Image generation device
256: Play area storage section
258: Map storage section
262: Captured image acquisition section
264: Play area control section
274: Crop section
276: State information acquisition section
278: Crop rule storage section
292: Display control section

The invention claimed is:

1. An information processing device comprising:
a memory comprising computer-executable instructions; and
a processor configured to access the memory and execute the computer-executable instructions to perform operations comprising:
receiving, by the information processing device from a camera in a head-mounted display, a first image;
determining, by the information processing device, based at least in part on a user selection, a first operational mode of the information processing device from a plurality of operational modes;
identifying, by the information processing device, a first predetermined rule associated with the first operational mode from a plurality of predetermined rules, wherein:
each operational mode of the plurality of operational modes is associated with a different predetermined rule of the plurality of predetermined rules;
each predetermined rule of the plurality of predetermined rules defines a different image region of a received image to crop; and
each image region associated with each predetermined rule includes at least a portion of the received image that is mutually exclusive with another image region associated with another predetermined rule of the plurality of predetermined rules;

cropping, by the information processing device, based at least in part on the first predetermined rule, a first image region out of the first image;

analyzing, by the information processing device, the first image region to identify data associated with the first image region; and causing, by the information processing device, based at least in part on the data, the head-mounted display to display a second image different from the first image.

2. The information processing device of claim 1, wherein: analyzing the first image region includes determining three-dimensional information regarding a surrounding space of the head-mounted display; and the second image includes play area in which the user wearing the head-mounted display is movable.

3. The information processing device of claim 2, further comprising determining, by the information processing device, a posture of the user, wherein analyzing the first image region includes identifying a floor surface based at least in part on the posture.

4. The information processing device of claim 2, wherein analyzing the first image region includes analyzing the first image region to identify a floor surface in the three-dimensional information based at least in part on information regarding a direction of gravity that is indicated by a motion sensor incorporated in the head-mounted display.

5. The information processing device of claim 4, further comprising cropping, by the information processing device, the floor surface out of the first image.

6. The information processing device of claim 1, further comprising expanding the first image region when a positional change of the head-mounted display per unit time is smaller than a threshold value.

7. The information processing device of claim 1, further comprising cropping, by the information processing device, a second image region based at least in part on the data.

8. The information processing device of claim 7, wherein the data includes a direction of an optical axis of the camera.

9. The information processing device of claim 1, wherein: the data includes a position and a posture of the head-mounted display.

10. The information processing device of claim 1, wherein the first image region includes a plurality of image regions.

11. A computer-implemented method comprising:

receiving, by an electronic device from a camera in a head-mounted display, a first image;

determining, by the electronic device, based at least in part on a user selection, a first operational mode of the electronic device from a plurality of operational modes;

identifying, by the electronic device, a first predetermined rule associated with the first operational mode from a plurality of predetermined rules, wherein:

each operational mode of the plurality of operational modes is associated with a different predetermined rule of the plurality of predetermined rules;

each predetermined rule of the plurality of predetermined rules defines a different image region of a received image to crop; and each image region associated with each predetermined rule includes at least a portion of the received image that is mutually exclusive with another image region associated with another predetermined rule of the plurality of predetermined rules;

cropping, by the electronic device, based at least in part on the first predetermined rule, a first image region out of the first image;

analyzing, by the electronic device, the first image region to identify data associated with the first image region; and causing, by the electronic device, based at least in part on the data, the head-mounted display to display a second image different from the first image.

12. The computer-implemented method of claim 11, wherein:

the first operational mode is an application operational mode corresponding to an execution of a user-selected application; and the data includes feature data used in the execution of the user-selected application.

13. The computer-implemented method of claim 12, wherein the user-selected application includes a video game application.

14. The computer-implemented method of claim 11, wherein the first predetermined rule includes cropping a central interior region of the received image.

15. The computer-implemented method of claim 11, wherein the first predetermined rule includes cropping a region of an image based at least in part on a direction of an optical axis of the camera.

16. The computer-implemented method of claim 11, wherein cropping the first image region is performed prior to analyzing the first image region.

17. One or more non-transitory computer-readable media comprising computer-executable instructions that, when executed by one or more processors of an electronic device, cause the electronic device to perform operations comprising:

receiving, by an electronic device from a camera in a head-mounted display, a first image;

determining, by the electronic device, based at least in part on a user selection, a first operational mode of the electronic device from a plurality of operational modes;

identifying, by the electronic device, a first predetermined rule associated with the first operational mode from a plurality of predetermined rules, wherein:

each operational mode of the plurality of operational modes is associated with a different predetermined rule of the plurality of predetermined rules;

each predetermined rule of the plurality of predetermined rules defines a different image region of a received image to crop; and each image region associated with each predetermined rule includes at least a portion of the received image that is mutually exclusive with another image region associated with another predetermined rule of the plurality of predetermined rules;

cropping, by the electronic device, based at least in part on the first predetermined rule, a first image region out of the first image;

analyzing, by the electronic device, the first image region to identify data associated with the first image region; and causing, by the electronic device, based at least in part on the data, the head- mounted display to display a second image different from the first image.

18. The one or more non-transitory computer-readable media of claim 17, wherein:

the first operational mode is an application operational mode corresponding to an execution of a user-selected application; and the data includes feature data used in the execution of the user-selected application.

19. The one or more non-transitory computer-readable media of claim 17, wherein the first predetermined rule includes cropping a central interior region of the received image.

20. The one or more non-transitory computer-readable media of claim 17, wherein the first predetermined rule includes cropping a region of an image based at least in part on a direction of an optical axis of the camera.

\* \* \* \* \*